United States Patent [19]

Bodker

[11] Patent Number: 4,819,369
[45] Date of Patent: Apr. 11, 1989

[54] APPARATUS FOR THE "BAITLESS" HARVESTING OF CRAWFISH

[76] Inventor: Ed Bodker, 364 Peachtree Blvd., Baton Rouge, La. 70806

[21] Appl. No.: 638

[22] Filed: Jan. 5, 1987

[51] Int. Cl.[4] .............................................. A01K 69/04
[52] U.S. Cl. ............................................ 43/102; 43/103
[58] Field of Search ................. 43/100, 101, 102, 103, 43/104, 105, 106

[56] References Cited

U.S. PATENT DOCUMENTS

| 729,786 | 6/1903 | McDaniel | 43/66 |
|---|---|---|---|
| 741,935 | 10/1903 | Schickerling | 43/66 |
| 1,085,970 | 2/1914 | Butcher . | |
| 1,142,781 | 6/1915 | Cameron . | |
| 1,455,381 | 5/1923 | Axiotes . | |
| 2,377,967 | 6/1945 | Rice . | |
| 2,530,449 | 11/1950 | Bush | 43/102 |
| 2,562,663 | 7/1951 | Golaszewski . | |
| 2,677,210 | 5/1954 | Abrahamsen | 43/103 |
| 3,191,338 | 6/1965 | Burgess et al. | 43/102 |
| 3,795,073 | 3/1974 | Olsen | 43/100 |
| 3,821,861 | 7/1974 | Jalbert | 43/100 |
| 3,940,876 | 3/1976 | Zaccaira . | |
| 3,992,804 | 11/1976 | Senese | 43/103 |
| 4,091,560 | 5/1978 | Haertling . | |
| 4,159,591 | 7/1979 | Plante | 43/100 |
| 4,251,944 | 2/1981 | Fulopp | 43/66 |
| 4,429,659 | 2/1984 | Holyoak | 43/103 |
| 4,509,288 | 4/1985 | Sheperd | 43/102 |
| 4,583,316 | 4/1986 | Holtgrefe . | |

Primary Examiner—M. Jordan
Assistant Examiner—Karen S. Killman
Attorney, Agent, or Firm—Pravel, Gambrell, Hewitt, Kimball & Krieger

[57] ABSTRACT

A baitless crayfish harvesting apparatus having a primary collection chamber, a plurality of passageways positioned is relation to the collection chamber, each of the passageways having an entrance door and an exit door, for luring a crayfish thereinto, and allowing the crayfish to travel in a single direction from outside of the collection chamber into the collection chamber during the harvesting of the crayfish.

18 Claims, 2 Drawing Sheets

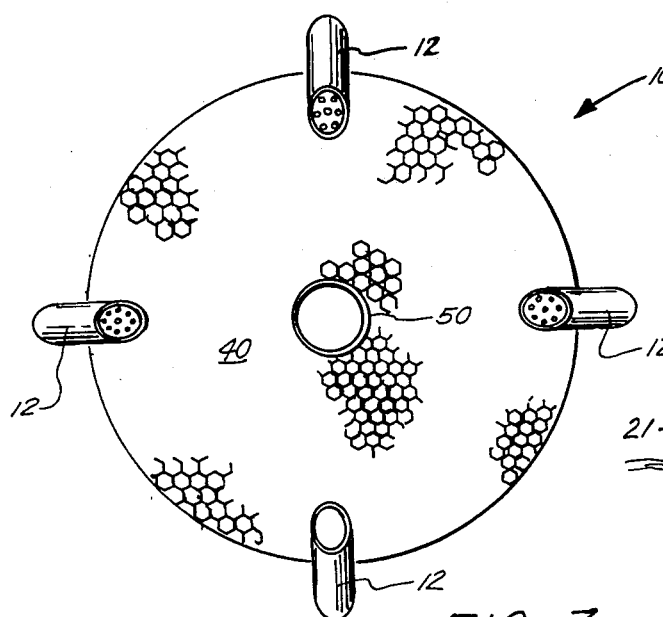
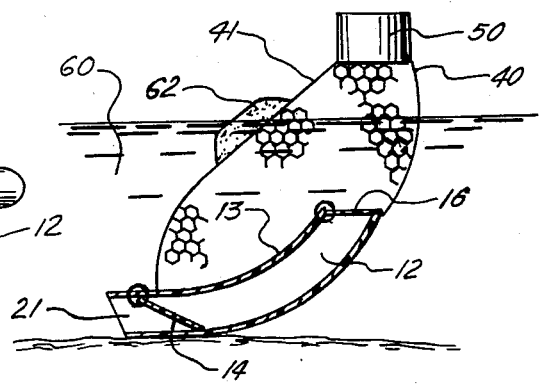
FIG. 7.
FIG. 8.
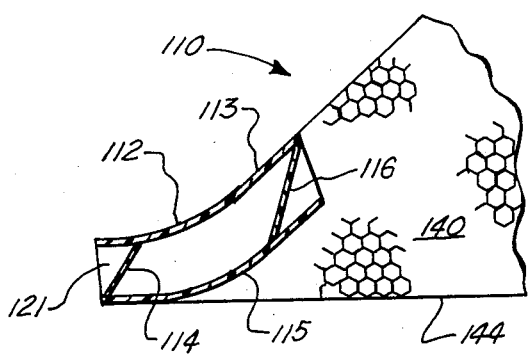
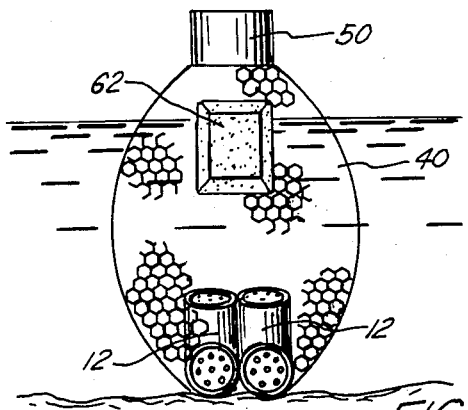
FIG. 12.
FIG. 9.
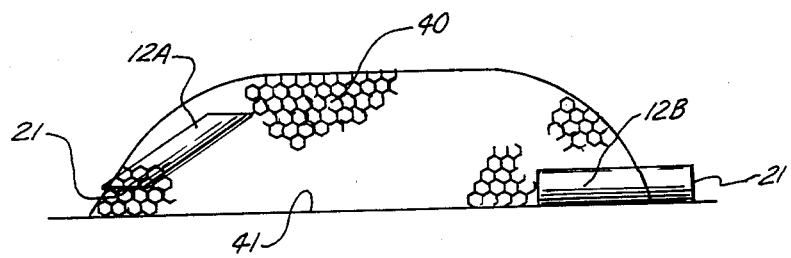
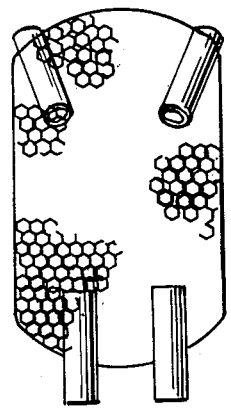
FIG. 10.
FIG. 11.

APPARATUS FOR THE "BAITLESS" HARVESTING OF CRAWFISH

BACKGROUND OF THE INVENTION

1. Field Of The Invention

The present invention relates to the cultivation and harvest of aquatic crustaceans of the families Cambaridae and Astacidae and more particularly, relates to a method and apparatus for the "baitless" harvesting of crawfish. This method and apparatus even more particularly relates to the harvest of crawfish through the use of cylindrical (not necessarily round), shaped hides (tubes), for the purpose of attracting crawfish; directional movement and confinement of crawfish through the additional use of sinking and/or floating trap door(s); and for the accumulation of crawfish by use of a collection chamber.

2. General Background

Within the growing aquaculture industry are two families and various species of eatable freshwater crustacea of which belong to the general Procambarus and Pacifastacus.

As an established, renewable industry in Louisiana and rapidly expanding to other states as well as foreign countries, crawfish farming provides a source of food which in the Southern United States is usually referred to as "crawfish", "crayfish" or "crawdads". Due to the popularity of crawfish in France and as a result of the "Acadian" or "Cajun" influence in Louisiana, the French term "ecrevisse" also denotes this animal.

Crawfish are consumed in large quantities during a typical crawfish season. Along the Gulf Coast, many seafood restaurants feature crawfish as a speciality preparing them in a variety of ways. In areas where crawfish are raised in abundance, large processing plants handle thousands of pounds of crawfish daily. Louisiana alone produces up to 70 million dollars worth of crawfish annually and has expanded acreage for crawfish culture every year since 1960 (2,000 acres) to 1985 (125,000 acres), with anticipated growth in the coming years expected to reach an excess of 400,000 acres.

The expansion of crawfish markets and production has brought into sharp focus some significant problems facing this industry. One of the major problems which each crawfish farmer must address is finding an economic and reliable means of harvesting a crop of crawfish. In many cases, the cost of harvesting crawfish approaches 50% of their market value. The use of bait as an attractant in conjunction with some sort of net or trap has been and remains the primary method for harvesting crawfish.

The simple method of catching crawfish with a piece of bait tied to a string is often used by children along roadside ditches. Recreational crawfishing by adults most frequently employees baited lift nets. The vast majority of the commercial crawfish catch is harvested using baited wire mesh traps having funnels. Such traps allow crawfish to easily enter attracted by the bait, but makes it difficult for them to find their way out of the trap.

In order for crawfish ponds to be considered productive, intensive and continuous harvesting must take place so as to remove crawfish as soon as they become market size and thereby making the limited space and food supply available to be used by smaller and immature crawfish. Current recommendations call for daily harvest using thirty to forty traps per acre in commercial crawfish ponds. "Fishing" crawfish ponds in this manner produces for a maximum yield yet cost for buying storing and handling bait becomes critical. It is not uncommon for a 100 acre crawfish farm to incur expenses relating to bait to be in excess of $20,000 dollars during a single season.

Not only is crawfish bait expensive, it makes for additional labor considerations and involves the task of handling bait which is messy and which often has a strong unpleasant odor. The use of bait for the purpose of harvesting crawfish although a primitive and expensive procedure has yet to be replaced by alternative methods.

Recognized as a bottle neck in the culture of crawfish, much research by universities and many individuals has been conducted towards finding an improved method and design for harvesting crawfish.

Some of the alternate approaches to the traditional "baited" trap includes (1) electric harvesters which "shock" crawfish to the surface and allows a scooping device to catch them as a harvester moves through a pond; (2) the use of water current which takes advantage of behavorial tendencies for crawfish to move in certain patterns according to direction of flow; (3) traditional and modified seines and trawls; (4) the use of vibrations to attract or repel crawfish; and finally (5) chemical attractants.

Additional research has been conducted to improve traditional "baited" trap use and design. Research for improving the efficiency of baited traps have included the development of an irrigation type harvester which moves slowly back and forth across a pond setting and emptying traps as it goes.

The research and development of artificial (processed) bait has become influential and widely used among crawfish farmers although natural bait such as cut fish continues to be used in large quantities.

The disadvantage of using bait to entice crawfish into a trap extends far beyond the cost of the bait itself. Bait which is subject to spoilage must be refrigerated. On a daily basis harvesting requires bait such a fish to be cut into individual portions suitable for each trap, placed in each trap and then removed when it is no longer fresh. Often bait, both natural and artificial, becomes mixed with crawfish when traps are being emptied. Old bait mixed in with live crawfish increases mortality and spoilage, appears unappetizing and must be removed before cooking or processing.

Two essential criteria must be met before a baitless method of harvesting crawfish can be considered successful.

The method must first have the ability to catch sufficient numbers of marketable crawfish within a specified body of water. Secondly, the method and devise must be cost effective to both construct and use. Other factors to be considered include the ability for a baitless trap or method of harvesting to catch larger crawfish while allowing smaller crawfish to remain in the ponds for continued growth. Such a method should also be adaptable for use in a significant portion of commercial crawfish habitant during the harvest season.

In addition to being attracted to bait, it is well known that crawfish exhibit a behavorial characteristic for seeking out places to hide. As typical for most nocturnal creatures crawfish are active at night moving about from place to place seeking food and optimum environmental conditions including shelter. During daylight hours, crawfish are relatively inactive frequently remaining in or near a place to hide. Often crawfish maintain burrows on the edges or bottoms of ponds as a source of shelter in which they can hide and escape from their many predators. In natural habitats like swamps, streams and other natural bodies of water, natural debris such as rocks, tree limbs and roots, as well as man-made substrates is often are available for crawfish to hide in and among.

Cultivated crawfish ponds especially those planted with rice are usually free of an abundance of substrate other than the rice, stable itself. Under such conditions the proper use of artificial hides provides a strong attractant for crawfish. Crawfish will move in and out through appropriately shaped hides when active, although this behavior is not as apparent during daylight hours.

In order to take advantage of this behavorial characteristic, a viable trapping device using hide(s) as an attractant, would have to catch sufficient numbers of crawfish in order to considered a successful harvesting technique. It has been falsely assumed that as a method of harvesting crawfish, the use of hides could not function effectively. This assumption is based on the observation that once a crawfish "inhabits" a hide it often remains there for long periods of time during which it discourages other crawfish from using the same space. If a crawfish were therefore to remain within one particular hide, it would require numerous hides to attract sufficient quantities of crawfish. Large numbers of such hides would be expensive, excessively bulky and unmanageable to harvest as they would be awkward to lift from the water and would create problems with removing the crawfish from the hide(s) as it is common for crawfish to resist being "dislodged" from within the protection of the hide.

During the research of the present invention it was discovered that one or a few relative individual tubes could be as effective as many individual hides if individual crawfish entered but did not remain within the inner space of the tube. The extent to which this "baitless" trap becomes efficient depends on a variety of factors but to a very large extent it depends on whether or not the tube or hide remains occupied or vacant.

The design of the present invention is such that once a crawfish enters the tube and passes beyond a trap door he will discover the only path of movement is through the tube away from the direction of entrance and towards a point of collection. For the efficiency of the trap design a second trap door is positioned near the exit of the tube which opens into a collection chamber. The second trap door functions to keep crawfish from reentering the tube from the collection chamber side and thus prevents interference with additional crawfish moving through the trapping tube towards the collection chamber. In this fashion the entrance to the trap remains, for the most part, available for occupancy. The result of this design therefore minimizes the number of trapping tubes necessary for use thus reducing construction cost and making for a trap which is practical to lift and empty. The movable door(s) which conforms to the inside dimensions of the tube are made out of a strong but lightweight material such as plastic. Trap door(s) at the entrance of the trapping tube(s) are positioned in such a way as to provide a perceptible space which the crawfish would occupy. The trap door(s) used in the present invention can be made of either sinking or floating material.

If a floating door is used, the end of the door most proximal to the entrance is attached by a simple hinge, such as an O ring made of plastic or metal, to the bottom or floor of the tube so that the most distal end will float to the roof or top of the tube. As a crawfish enters the openings of the tube, he will position himself on top of the trap door discovering that his weight and his movement into the tube will move the floating door downward creating an opening for access further into the tube. Once a crawfish moves beyond the length of the trap door, the distal end of the trap door will again float to the top of the tube and thus seal off the passage way. When a crawfish, which has moved beyond the trap door tries to move back towards the entrance, the angle of the trap door would then be such that his movement only causes the unattached end of the door to be more firmly forced against the top of the tube. With this restriction, a crawfish would then become limited to movement towards the collection chamber.

If a sinking trap door is used near the entrance of the tube trap, the end of the door proximal to the entrance is attached to the top of the tube with the distal end of the trap door sinking at an angle and resting on the bottom of the tube. The sinking trap door works similar to the floating door with the exception of having movement which is directionally opposite. In the case of the sinking trap door a crawfish forces the door upward moving under it as he progresses deeper into the tube. With the effort to move back towards the entrance of the trap, the crawfish walks on top of the trap door which is being held to the top of the tube by a hinge on one end and is being forced against the floor of the tube on the other end. Again this creates a situation in which a crawfish is limited in movement toward the direction of the collection chamber.

A second trap door near the exit of the tube and at the entrance of the collection chamber functions for the overall improvements of the trap design to prevent crawfish which are already in the collection chamber from re-entering the trapping tube and occupying the tube space behind the first trap door. Such a second trap door working by either the floating or the sinking method similar to that first trap door is positioned so as not to create an unnecessary space on the collection chamber side of the tube which a crawfish could occupy. This can be accomplished by beveling the tube and/or positioning the trap door so that when observed from the collection chamber side, the tube would not appear to have a recess large enough to accommodate a harvestible size crawfish.

Thus, a second trap door prevents crawfish from returning to the space behind the first trap door and the positioning of a second trap door in conjunction with contour of the tube exit eliminates unnecessary space from the tube behind the second door.

For the improved efficiency of the overall trap design trap doors can be constructed so as to allow both a perception to the crawfish that space behind the door is available and that the weight or resistance of the trap door does not present an obstacle for utilizing this space. Trap doors should therefore be constructed with a minimal thickness and shape so as up and down movement will not be restricted by the sides of the tube while at the same time providing sufficient width to block off the passage way when the door is in a closed position. Slits or holes in the trap door increases the perception of available space behind the door and allows water to flow through the door reducing resistance and making access into the tube easier by the crawfish. The weight or buoyancy of a trap door should, however, be sufficient so that the door will sink or float closed in a definitive manner and not remain open except for the short time it takes for the crawfish to pass through.

The collection chamber of the tube trap should correspond in size to be no larger than necessary to accommodate the expected maximum yield for each trap. Similar to traditional wire crawfish traps using bait at least a portion of the collection chamber should be constructed out of a graded mesh material sized to retain larger crawfish while permitting smaller ones to escape. The collection chamber can be contoured in relation to the tube to improve the efficiency at the trap in such a way so that when crawfish accumulate in the chamber they do not interfere with crawfish in the tube(s) attempting to enter the collection chamber. One way to accomplish this it to have the exit end of the tube bent or slanted upwards away from the bottom of the trap thus allowing crawfish to enter a tube which is at or near the bottom of the pond and exit the tube inside the trap above the floor of the collection chamber. In this fashion, crawfish collect mostly down along the bottom of the trap away from the tube exit.

Other considerations for the efficiency of this baitless trap design includes the positioning of the trap door(s) and the shape of the entrance of the tube. It was found that the positioning of the entrance trap door was important to the willingness of the crawfish to enter the trap. Trap doors at the entrance of the trap which were not recessed enough were slower to attract crawfish than those which were sufficiently recessed. If the trap door was recessed too far into the tube, crawfish would occupy the space in front of the trap door and would be slower to move deeper into the tube. Trap door(s) recessed too far into the tube would also make for additional cost as the tube would be longer than necessary.

Additional factors though subtle in their individual effect make for improved efficiency in the overall trap design. One such modification concerns the shape and size of the entrance opening. The entrance end of a tube was found to attract crawfish faster if the opening surface area was increased giving crawfish more opportunity to discover the way into the trap. Experimentation demonstrated that beveling the tube(s) and/or flaring them outward near the entrance provided crawfish with a greater ability to discover access within the tube(s). In this fashion crawfish approaching the trap from either side could more easily perceive the entrance opening in addition to those approaching the trap from a head-on direction.

Another factor in influencing the efficiency of a tube trap is the length of space between the first trap door and the exit opening or a second trap door. Crawfish passing through the first trap door were less likely to continue forward progress if they encountered a second trap door before their body had completely passed beyond the first door. If the space between the trap door(s) or the first trap door and exit opening is excessively long, it increases the time it takes for the crawfish to enter the collection chamber, makes the trap more cumbersome and makes for unnecessary cost of additional construction materials.

Although tube traps are designed to have a baitless feature as an attractant for a method of harvesting crawfish, under certain circumstances, bait may be added to these traps which in such a case would function to provide both a baitless attractant and a baited attractant.

The use of a baitless attractant as a feature on this trap design is, therefore, not intended to function necessarily to the exclusion of bait but under certain conditions, may include the use of bait as an attractant in addition to this baitless feature.

It should also be noted that when using bait as an attractant with the trapping tubes of this invention clear or transparent tubes may be employed for use and although not preferred because it minimizes the baitless aspect they could be used to function according to its trapping aspect or features.

By using a trap which has a baitless attractant, a mechanical lifting and emptying devise becomes much more practical. Without having to use bait a mechanical arm attached to a harvester (boat, etc.), could lift each trap, invert it so that the crawfish will fall out an escape proof opening in the collection chamber and onto a conveyor or trough leading back to the harvester, and then reset the trap back into the water. As a labor saving device, the trap and the mechanical arm would conform to each other and function in a motion which allows continuous and sustained movement of a harvester moving throughout a crawfish pond.

BRIEF DESCRIPTION OF THE DRAWINGS

For further understanding of the nature and objects of the present invention reference should be had to the following detailed description, taken in conjunction with the accompanying drawings, in which like parts are given like reference numerals and wherein:

FIG. 7 is a top view of the preferred embodiment of the apparatus of the present invention showing a style of tube trap having a plurality of trapping tubes oriented in different directions;

FIG. 8 is a side view of the apparatus of the present invention showing a style of tube trap having a single direction orientation of the trapping tube(s);

FIG. 9 is a side view of the apparatus of the present invention showing a style of tube trap having a single direction orientation of the trapping tube(s);

FIG. 10 is a side view of the apparatus of the present invention showing a style of tube trap having trapping tubes in slanted and horizontal positions; and FIG. 11 is a top view of the apparatus of the present invention showing a style of tube trap having trapping tubes in slanted and horizontal positions.

FIG. 12 is a side view of another embodiment of the present invention having buoyant door members.

DETAILED DESCRIPTION OF THE PREFERRED EMBODIMENT

Figure 1:
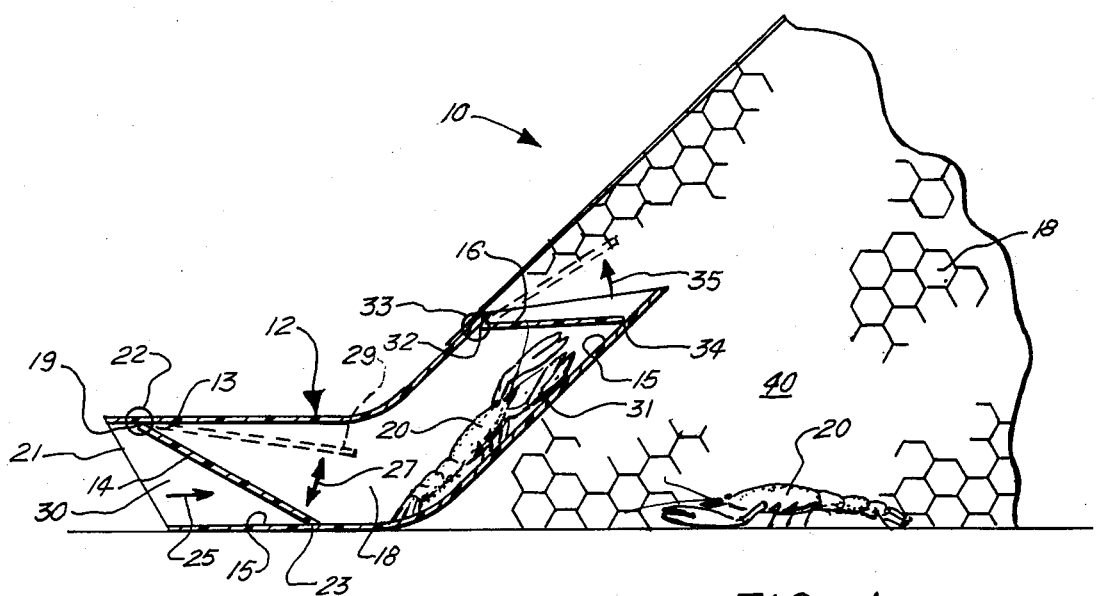
FIG. 1 is a partially broken-away view of the preferred embodiment of the apparatus of the present invention showing the trapping tube and a portion of the collection chamber.

FIGS. 1-11 represent the preferred embodiment of the apparatus of the present invention, with FIGS. 6-11 serving as examples of three different configurations of tube trap 10 for baitless harvesting of crayfish, each of which are subject matter of the preferred embodiment. Tube traps 10 serve as means for the confinement, directional movement and collection of crayfish, and, as seen in the FIGURES, are generally comprised of trapping tubes 12 which are more particularly shown in FIGS. 1-5, with trapping tubes 12 constructed of, for example short hollow cylindrical sections of plastic pipe or similar material, further including sinking and/or floating trap doors 14 and 16, within tubes 12, the trap doors 14 and 16 preferably constructed of fiber glass, plastic or some other strong thin material, and the third component, the collection chamber 40 made of graded mesh type material such as plastic coated wires.

Figure 2:
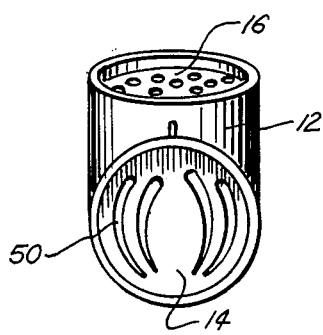
FIG. 2 is a front view of the preferred embodiment of the apparatus of the present invention showing the trapping tube with the entrance trap door in a closed position.
Figure 3:
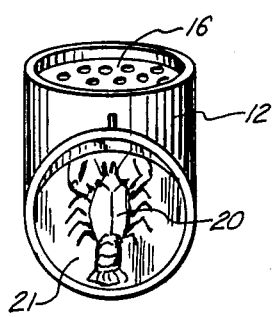
FIG. 3 is a front view of the preferred embodiment of the apparatus of the present invention showing the trapping tube with the entrance trap door in a open position.

Turning now to the particular structure of trapping tubes 12, reference is made to FIGS. 1-3. In the FIGURES, trapping tubes 12 are illustrated as elongated hollow tube like structures having for example a modified side diameter measuring 1-3 inches and a length measuring 3-18 inches so that the tubes may easily accommodate the width of harvestible size crawfish 20, as seen in the drawings. In the preferred embodiment, each trapping tube 12 would further comprise a first entrance 21, as was stated earlier 1-3 inches in diameter, in order to accommodate a crayfish 20 therethrough, the entrance 21 having a recessed entrance door portion 14 which is hingedly attached to the upper wall 13 of tube 12 via a rubber O-ring or the like 22, and when in the closed position the lower end portion 23 resting on the floor 15 of tube 12. As is illustrated in FIG. 1, while in the closed position, door 14 is positioned so that the lower most end portion 23 is at a substantially forward resting position than top portion 19, for the purpose to provide that when crayfish 20 is moving into tube 12 in the direction of Arrow 25, hinged door 14 is pushed upward in the direction of Arrow 27, moves or "floats" upward in the position as seen in phantom view 29, with crayfish 20 entering into confined space 18. Following the entrance of crayfish into space 18, door portion 14 would be allowed to return to the closed position, in order to avoid any retreat of crayfish 20 out of tube 12 once it has entered therein. For purposes of structure, it should be noted that entrance opening 21 is provided with a recessed chamber 30 between the end portion of tube 12 and door 14, which serves as a means for attracting the crayfish into the "darkened" recessed chamber prior to its contact with door 14. This, in effect, shall further lure crayfish 20 into confinement chamber 18.

Following the entrance of crayfish 20 into confinement chamber 18, crayfish 20, as seen particularly in FIG. 1, shall be on the up sloping portion 31 of tube 12, within confinement chamber 18. Crayfish 20 will continue to move through confinement portion 18 and will encounter exit door 16, which again like entrance door 14, is attached at its upper end portion 32 to tube 12 via O-ring 33, and again with its lower most end portion 34 being diagonally forward of the upper end 33 and resting on the floor portion 15 of tube 12. Likewise, upon crayfish 20 encountering door 16, door 16 shall be "raised" open to the open position as seen by Arrow 35, and allow crayfish 20 to exit the tube as seen particularly in FIG. 6. Following the crayfish exiting tube 12, door 16 will again be lowered in the closed position as seen in FIG. 1, and therefore the crayfish will then be contained within collection chamber 40.

Each trapping tube 12 is attached to collection chamber 40 in such a way that allows the entrance 21 of tube 12 to be open to a water column and within close proximity to pond bottoms inhabited by crayfish 20. The exit of each trapping tube 12 opens to the inside of collection chamber 40 into which crayfish enter and from which crayfish cannot escape. The trapping tubes 12 can be attached for example with wire clips to the bottom 41 of collection chamber 40 so as to remain secured during the harvesting process. Trapping tubes 12 can be positioned within each collection chamber 40 in various numbers, angles and directions and can be constructed to collectively be representative of a variety of styles and configurations in which some examples will be depicted further in FIGS. 6-11.

In effect, the positioning and number of collection tubes trapping tubes 12 would maximize the effectiveness of these trapping tubes 12 can be arranged in a fashion which would encourage crayfish to enter, move through and exit the tubes and once inside the collection chamber 40 present minimal interference with subsequent crayfish taking the same course of sequential movements.

Figure 6:
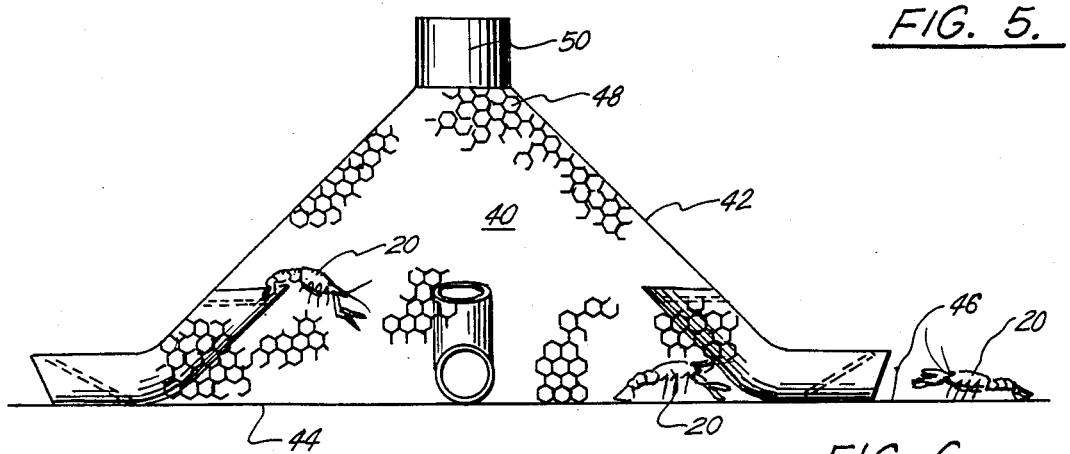
FIG. 6 is a profile view of the preferred embodiment of the apparatus of the present invention showing a style of tube trap having a plurality of trapping tubes oriented in different directions.

As seen in FIG. 6, collection chamber 40 would substantially comprise a confinement area defined by four walls 42 which have a broad base portion 44 resting on the bottom of a pond 46 or the like and each of the wall portions slanting upward to a top cone configuration 48 having an open top 50 from which crayfish contained within the confines of chamber 40 would be dumped out after collection of the trap. As seen particularly in FIGS. 6 and 7, in this configuration there are included 4 trapping tubes 12, one in each quadrant of container portion of 40 so as to have an entrance for crayfish from each of the four directions.

For purposes of more definite structure contained within trapping tubes 12, reference is made to FIGS. 2-5.

Figure 4:
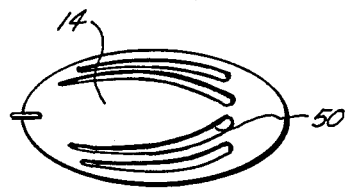
FIG. 4 is a horizontal top view of the preferred embodiment of the apparatus of the present invention showing the entrance trap door.

As seen in FIG. 3, collection tube 12 is provided with the entrance door 14, as illustrated further in FIG. 4, having a plurality of flow spaces 50 therein, so that as the crayfish 20 makes contact with entrance door 14, entrance door 14 is moved out of the closed position as seen in FIG. 1, to the open position against less resistance of the water contained in confinement chamber 18 of tube 12. In addition, when the entrance door 14 is allowed to return to the closed position as seen in FIG. 1, again flow spaces 50 allow less resistance against the water on the opposite side of crayfish 20.

Likewise, reference is made to FIG. 5, which illustrates again exit door 16, as with entrance door 14, is also provided with a plurality of flow spaces 52 in this case, as seen in the Figure, a plurality of bores so that again door 16 may open and close against less resistance from the water when crayfish 20 wishes to move through the space of the confinement chamber 18. Entrance and exit doors 14 and 16 respectively as shown in FIGS. 4 and 5 are constructed of strong and thin pieces of material such as plastic or fiberglass and may be made to either sink or float according to which embodiment is preferred.

Figure 5:
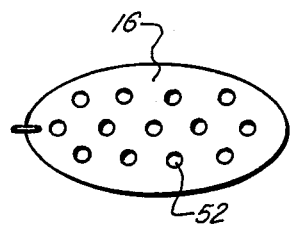
FIG. 5 is a horizontal top view of the preferred embodiment of the apparatus of the present invention showing the exit trap door.

As was stated earlier, the doors in FIGS. 4 and 5 are shaped in such a way that when attached by hinges in FIGS. 2 and 3, they are positioned within tube 12 so as to remain in the closed position, to block off any passage and prevent crayfish from moving back towards the direction from which they came when the doors were in an open position as seen in phantom view in FIG. 1. The shape of the doors 14 and 16 in view of such as to allow a diagonal up and down movement of the doors to occur in a fashion which is distal from the point where it is connected at hinge 19 or 33 respectively, the greatest degree of motion taking place towards the end of the trap door that is not attached by a hide that rest either against the floor of the tube (for sinking trap doors), or against the roof of the tube (for floating trap doors), of the trapping tube.

As was stated earlier, collection chamber 40 is an enclosure made of a porous material (such as plastic coated wire), with holes or openings small enough to prevent escape of harvestible size crayfish. The chamber 40 is attached to a trapping tube as seen in FIG. 1 in such a way that has the entrance opening 21 of the tube 12 is external and the exit opening 34 internal to the inside of the collection chamber 40. The collection chamber 40 should have an opening or a means of removing the crayfish 20 from the enclosure. This means would comprise a collar 50, as seen in FIG. 6, comprising the upper most opening 48 in the collection chamber 40. Such a collar may be constructed of plastic, metal, or the like, which is smooth enough and with the wall high and steep enough to prevent crayfish from climbing out. The design in FIG. 6 provides an easy means of harvesting by which the trap is emptied by simply lifting the trap out of the water and inserting it so that the crayfish 20 will fall through the opening of the escape roof collar 50, and into a suitable container.

FIGS. 8-11 illustrate additional embodiments of the apparatus of the present invention. As seen in FIGS. 8 and 9, this particular embodiment illustrates a collection chamber 40, which is partially floatable via a floatation means 62 attached to its upper side 41 and with the trapping tubes resting on the bottom. There is included the wire cage body portion 40, with the removal means or collar 50 at its upper most portion above the surface of the water, with one or more entrance tubes 12 contained on its lower most portion, with the entrance tubes 12 being constructed substantially as with the preferred embodiment. In effect, this particular embodiment would be semi-floatable on a body of water during use of the apparatus but would remain in a given location.

An additional embodiment of the apparatus as seen in FIGS. 10 and 11 presents again a container portion 40 constructed of wire screen or the like, having at least a pair of entrance tubes on either end of the apparatus, with a first pair of tubes 12B being substantially parallel with the surface 46 upon which the trap is placed, and a second pair of entrance tubes 12A, in this embodiment, being situated diagonally so that the crayfish have to enter the tube as with the preferred embodiment. Unlike the preferred embodiment, this embodiment has no crayfish removal collar 50, so therefore any crayfish contained in this particular trap would have to be removed when the trap is removed from its place on surface 46.

FIG. 12 shows an embodiment of the present invention, tube trap 110, having buoyant doors 114 and 116. Buoyant doors 114 and 116 are hingedly attached at their lower ends to the floor 115 of tube 112, and are biased by buoyant force such that their upper ends rest against upper wall 113 of tube 112. Trap 110 is placed as is shown in FIG. 12, with its bottom 144 on the bottom of a body of water. When crawfish crawl onto door 114, the upper end of door 114 moves downward, allowing the crawfish to enter tube 112. After the crawfish passes door 114, buoyant force biases door 114 back to the position shown in FIG. 12, preventing the crawfish from exciting via entrance 121. The crawfish later crawls onto door 116, the upper end of which moves downward due to the weight of the crawfish, allowing the crawfish to enter collection chamber 140. After the crawfish crawls off of door 116, buoyant force causes door 116 to return to the position shown in FIG. 12. The crawfish is thus prevented from re-entering tube 112, and remains in chamber 114 until gathered by the harvester.

The method of crawfish harvesting using tube traps 10 described in this invention can be accomplished by setting or placing such traps in water bodies containing a harvestible population of crawfish. Tube traps 10 are set in such a way (FIGS. 6, 8 or 10) which allows the entrance opening 21 of the trapping tube 12 to rest on or be close to the bottom of the body of water. Traps 10 may partially extend above the surface of the water, but if the trap is completely submerged, open escape proof collars 50 should not be used. In the case of traps being submerged entirely, an opening which can be closed to prevent escape may be used to empty the traps. Once the trap is set as in the FIGURES, a waiting period should be observed to give the crawfish an opportunity to discover and enter the trap. Such a waiting period of time will depend greatly on a variety of factors such as weather conditions, population density and time of day and may range from several hours to a number of days. When traps are judged to have been set for a sufficient length of time (often 24 hours for example during the peak of the season), they are then lifted out of the water and the crawfish which have been caught are emptied into a container. The trap is then reset and the sequence is repeated.

Experimentation using this invention has also shown that crawfish ponds having less substrata for crawfish to hide in and among are more suitable for the use of tube traps than are ponds containing an abundance of substrata habitat. Consideration therefore may be taken for the construction of crawfish ponds which includes the method of harvesting anticipated for use.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An underwater baitless crawfish harvesting apparatus for use on a water bottom comprising:
    a. A primary collection chamber having an interior;
    b. enticing passageway means adapted for underwater use and communicating with the positioned adjacent the water bottom during operation and collection chamber for baitlessly enticing the crawfish to enter an area proximate the collection chamber, defining a conduit for crayfish entrance into the collection chamber the passageway means including a darkened hide section and an entrance for enticing crawfish to enter the passageway means from exterior the primary collection chamber, and an exit for allowing crawfish to exit the passageway means into the primary collection chamber, and c. means for allowing crawfish on the water bottom to freely enter, but not exit, the primary collection chamber underwater via the passageway means and including a door positioned adjacent the darkened hide section that prevents escape after the crawfish enters the hide section.

2. The apparatus of claim 1, further comprising means contained within the passageway means for biasing crawfish, once having entered the passageway, to travel in a single direction only toward and into the collection chamber.

3. The apparatus in claim 1, wherein the collection chamber comprises a wire mesh container having four walls and a floor portion for defining the container space therein.

4. The apparatus in claim 1, wherein the passageway means comprises a cylindrical darkened tube situated so that the entrance of the tube is located out of the colleciton chamber and the exit of the tube is located within the collection chamber.

5. The apparatus in claim 4, wherein he cylindrical tube further comprises a first door member for allowing a crayfish to enter the tube and a second door member allowing the crayfish to exit the tube in a single direction.

6. The apparatus in claim 5, wherein the cylindrical tube further comprises a darkened collection zone between the first and second door members so as to lure a crayfish therewithin.

7. An underwater baitless apparatus for harvesting crayfish, comprising:

a. a substantially enclosed collection chamber having a bottom, wall portions and a restricted top portion for defining a crayfish colleciton zone therewithin;

b. enticing means for baitlessly luring underwater crayfish from the exterior of the chamber to the interior of the chamber, said enticing means comprising a plurality of darkened passageways for receiving a crayfish crawling on a water bottom therein;

c. each of said passageways having a first, entrance door movable from a close to an open position under the force of a crayfish encounter, and a second, exit door movable from a first closed position to an open position allowing crayfish to enter into the collection zone, each of said doors further disallowing the crayfish from returning in the opposite direction within the passageway.

8. The apparatus in claim 7, further comprising an opening in the top portion of the apparatus for allowing the removal of the crayfish from the apparatus.

9. The apparatus in claim 1 wherein each of said doors further comprise means for allowing less restricted movement of the doors between the open and closed positions against the force of the water.

10. The apparatus in claim 7, wherein the passageway between the closed entrance door and the closed exit door defines a darkened passage for further luring the crayfish into the collection zone.

11. The apparatus in claim 7, including at least one movable door in a tube serving as the trapping technique for a rap which could use a bait attractant as an option.

12. A method of harvesting crawfish, the method comprising the steps of:

a. providing a trap means having a primary colleciton chamber and passageway means for allowing crawfish to enter the primary collection chamber, the passageway means including a darkened highed section and means for allowing crawfish to freely enter the colleciton chamber but not exit the trap means;

b. placing the trap means in a body of water; and c. removing crawfish form the trap means.

13. The method of claim 12, wherein the collection chamber comprises a material through which water but not harvest-size crawfish, may freely flow.

14. The method of claim 12, wherein the passageway means comprises an entrance and an exit, the entrance being located adjacent the exterior of the primary collection chamber.

15. The method of claim 12, wherein no bait is used in the trap means.

16. A crawfish harvesting apparatus comprising:

a. a primary collection chamber having an interior;

b. passageway means for allowing crawfish to enter the primary collection chamber, the passageway means comprising an entrance and an exit, the exit communicating with the interior of the primary collection chamber;

c. door means for allowing crawfish to enter, but not exit, the apparatus, the door means comprising a buoyant door member.

17. The apparatus of claim 16, wherein the passageway means comprises a darkened hide section.

18. The apparatus of claim 16, wherein the door member is hingedly attached to the passageway means adjacent a lower end of the door member.

* * * * *